(12) United States Patent
Hans

(10) Patent No.: US 11,155,202 B2
(45) Date of Patent: Oct. 26, 2021

(54) VEHICLE HAVING A REAR LIGHT HAVING A SCREEN WITH TAB WITH VISIBLE MARKINGS

(71) Applicant: Volkswagen Aktiengesellschaft, Wolfsburg (DE)

(72) Inventor: Sebastian Hans, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 17/162,427

(22) Filed: Jan. 29, 2021

(65) Prior Publication Data
US 2021/0229593 A1  Jul. 29, 2021

(30) Foreign Application Priority Data

Jan. 29, 2020 (DE) .................. 102020201053.6

(51) Int. Cl.
*B60Q 1/00* (2006.01)
*F21S 43/50* (2018.01)
*B60Q 1/30* (2006.01)

(52) U.S. Cl.
CPC .......... *B60Q 1/0064* (2013.01); *F21S 43/50* (2018.01); *B60Q 1/30* (2013.01)

(58) Field of Classification Search
CPC .............. F21S 43/26; B60Q 1/30; B60Q 1/26
See application file for complete search history.

(56) References Cited

U.S. PATENT DOCUMENTS 6,039,465 A    3/2000  Hirabayashi et al.
2004/0075537 A1  4/2004  Quigley et al.

FOREIGN PATENT DOCUMENTS

| DE | 8029947 U1 | 2/1981 |
|---|---|---|
| DE | 10239579 A1 | 1/2004 |
| DE | 10258293 A1 | 6/2004 |
| DE | 102006057671 A1 | 6/2008 |
| EP | 2565527 A1 | 3/2013 |
| EP | 2589859 A1 | 5/2013 |
| EP | 2525138 B1 | 10/2013 |

*Primary Examiner* — Robert J May
(74) *Attorney, Agent, or Firm* — Laurence A. Greenberg; Werner H. Stemer; Ralph E. Locher

(57) ABSTRACT

A motor vehicle has a rear light to which a screen, which covers a light housing of the rear light is attached in the region of a water channel arranged or formed adjacent to a rear opening of the motor vehicle. Advantageously, the screen has a passage opening or a cutout that, in the mounted state of the screen, is occupied by a tab of the light housing of the rear light whose shape is complementary to that of the passage opening or the cutout of the screen. The marks relating to the rear light are applied to a tab surface of the tab, and/or are introduced into the tab surface, that is visible from outside the vehicle when the screen is in its mounted state.

6 Claims, 2 Drawing Sheets

VEHICLE HAVING A REAR LIGHT HAVING A SCREEN WITH TAB WITH VISIBLE MARKINGS

CROSS-REFERENCE TO RELATED APPLICATION

This application claims the priority, under 35 U.S.C. § 119, of German patent application DE 10 2020 201 053.6, filed Jan. 29, 2020; the prior application is herewith incorporated by reference in its entirety.

BACKGROUND OF THE INVENTION

Field of the Invention

The invention relates to a motor vehicle having a rear light according to the preamble of the independent claim of the invention.

Statutory provisions require that specific marks, such as test marks and/or approval marks, regarding specific components and/or assemblies be arranged on motor vehicles in the visible region of the motor vehicle. In particular in a rear light or lamp of the motor vehicle, the test marks and/or approval marks according to, for example, ECE, CCC, SAE and/or the like are conventionally arranged either on a housing of the rear light, on a lens of the rear light and/or on a decorative screen covering the light housing of the rear light in the region of a water channel formed at the motor vehicle and formed next to a rear opening of the motor vehicle.

When the test and/or approval marks are applied to the decorative screen in the region of the water channel, preferably by means of a laser writing device, they must additionally be located on the rear light, resulting in increased complexity. Moreover, different test and/or approval marks can be found depending on the relevant market such as USA or Europe, resulting in additional variants or replacement part numbers of the decorative screen and thus likewise in increased complexity. This is the point from which the invention described below proceeds.

BRIEF SUMMARY OF THE INVENTION

It is thus the object of the invention to minimize the complexity for applying marks, in particular test and/or approval marks, with respect to rear lights on a motor vehicle as compared to the prior art.

Proceeding from a motor vehicle having a rear light to which a screen, which at least partially covers a light housing of the rear light, is attached in the region of a water channel arranged or formed adjacent to a rear opening of the motor vehicle, the object in question is achieved in that the screen has a passage opening or a cutout that, in the mounted state of the screen, is occupied by a tab of the light housing of the rear light whose shape is complementary to that of the passage opening or the cutout, wherein marks relating to the rear light are applied to a tab surface of the tab, and/or are introduced into the tab surface, that is visible from outside the vehicle when the screen is in its mounted state.

Owing to this measure, the complexity in terms of visibly applying marks relating to the rear light is advantageously minimized because the marks are now to be provided on the tab of the rear light and there is no need to additionally apply marks relating thereto to the screen. Further advantageously, a screen having a uniform embodiment can be used for all motor vehicles. Likewise advantageously, there is no need to create additional variants of the screen for different markets. Moreover, the tab can serve as an orientation aid during the mounting of the screen and thus advantageously decrease the production time.

The dependent claims describe preferred developments or configurations of the invention.

Accordingly, provision is preferably made that, in the mounted state of the screen, the tab is flush with the screen, certainly taking into account any tolerances that may occur, as a result of which, for the one part, a high fluid-tightness with respect to the water channel is attainable, and, for the other part, other possibilities where water and dirt may accumulate are avoided.

The invention furthermore makes provision that the tab is preferably connected fixedly to the light housing of the rear light, with further preference is formed in one piece therewith, resulting in material and manufacturing time being saved. Alternatively, the tab may also be releasably connected to the light housing so as to offer extended possibilities for assigning specific marks to the relevant light housing.

With preference, but not in a restrictive manner, the marks contain market-specific test and/or approval marks, marks for identifying the rear light, revision marks, distinguishing marks, orientation marks and/or symbols.

According to a simple and cost-effective measure, and thus with preference, the marks are introduced into the tab surface of the tab visible from the outside by way of laser marking. Alternatively, a set of tools that is known per se can also be used.

The invention also makes provision that, in a development of the invention, at least one further marking location for applying and/or introducing marks is advantageously provided at the light housing of the rear light directly next to the tab. These may be, for example, internal revision markings of the producer or supplier of the rear light and/or of the light housing with information relating to the building condition, the hardware status, software status, production date, circuit board version of the rear light and/or the like.

Other features which are considered as characteristic for the invention are set forth in the appended claims.

Although the invention is illustrated and described herein as embodied in a motor vehicle having a rear light, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
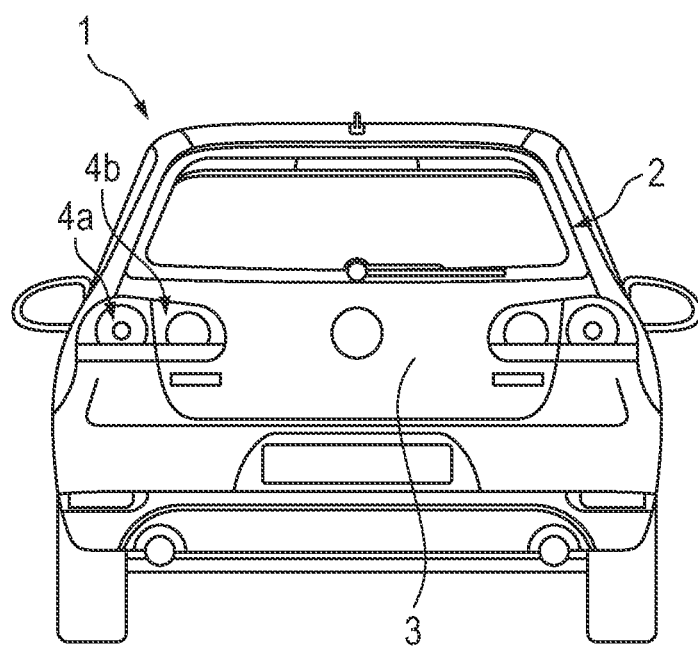
FIG. 1 is a rear view of a motor vehicle embodied according to the invention.

The following is a summary list of reference numerals and the corresponding structure used in the above description of the invention.

Referring now to the figures of the drawings in detail and first, particularly to FIG. 1 thereof, there is shown a rear view of a motor vehicle 1, having a tailgate 3 that closes a rear opening 2 of the motor vehicle 1. Rear lights 4a, 4b are arranged on either side of the motor vehicle 1, wherein one part of the rear lights 4a, 4b is mounted to the body and another part is mounted to the gate.

Figure 2:
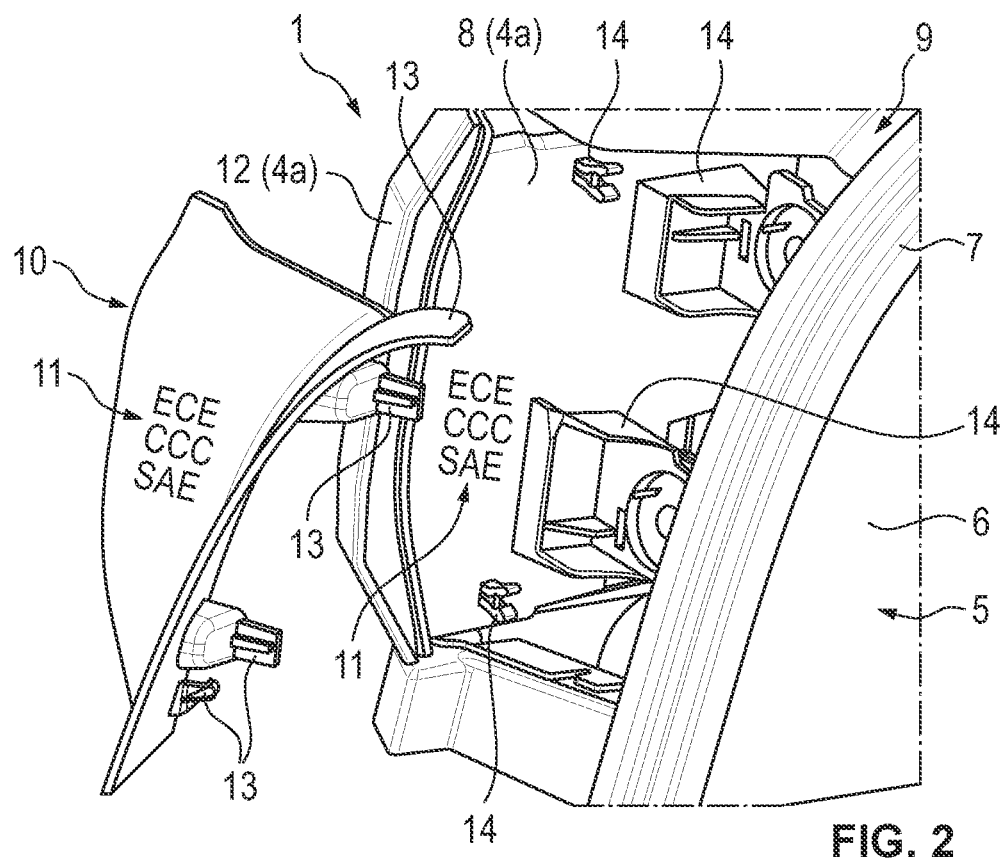
FIG. 2 is a perspective view of that region of the vehicle rear that is relevant to the invention in a case of an open tailgate with a light housing of a rear light of the motor vehicle and a screen in a pre-assembled state thereof according to the prior art.

According to FIG. 2, a water channel 9 is formed between a body panel 6, delimiting a rear cargo hold 5 of the motor vehicle 1, with a seal arrangement 7 for the tailgate 3 and a light housing 8 of a body-side rear light 4a, by means of which the water channel 9 water, in particular rainwater and washing water including dirt particles, is guided away from the motor vehicle 1 in a defined manner, as is known. As is further evident from FIG. 2, the rear light 4a or the light housing 8 thereof is assigned the same covering screen 10, which serves both for protection and for decorative purposes.

As has already been explained in the introductory part, statutory provisions require that specific marks 11, such as test and/or approval marks, be arranged in the visible region of the motor vehicle 1. With respect to the rear light 4a, the marks 11, i.e. test and/or approval marks, according to, for example, ECE, CCC, SAE and/or the like are arranged either on the light housing 8 of the rear light 4a, on a lens 12 of the rear light 4a and/or on the screen 10 covering the light housing 8, in the region where the water channel 9 is formed (cf. FIG. 2).

FIG. 2 in this case shows the screen 10 in a pre-assembled state. It has positive-locking means 13, whose counter positive-locking means 14 at the light housing 8 correspond to the former for the preferably releasable attachment of the screen 10 to the light housing 8. As is furthermore shown in FIG. 2, the marks 11 are conventionally arranged for the one part at the light housing 8 and for the other part at the screen 10, in this case so as to be visible from outside the vehicle, preferably provided on the light housing 8 and the screen 10 by laser marking or incorporated therein, which is associated with increased complexity. Alternatively, the marks 11 can also be provided at the light housing 8 and at the screen 10, or be incorporated therein, by means of a set of tools that is known per se.

Figure 3:
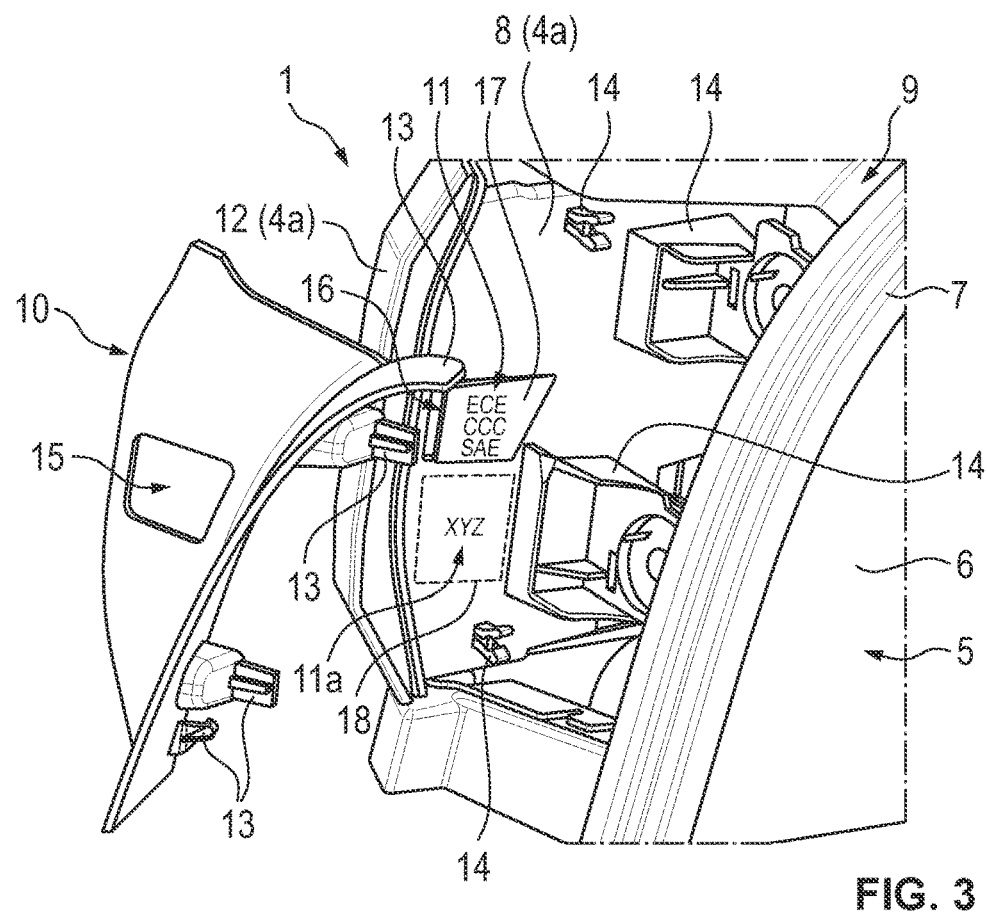
FIG. 3 is a perspective exploded view of the region of the vehicle rear that is relevant to the invention in the case of an open tailgate with a light housing of the rear light of the motor vehicle and the screen in the pre-assembled state thereof according to the invention.
Figure 4:
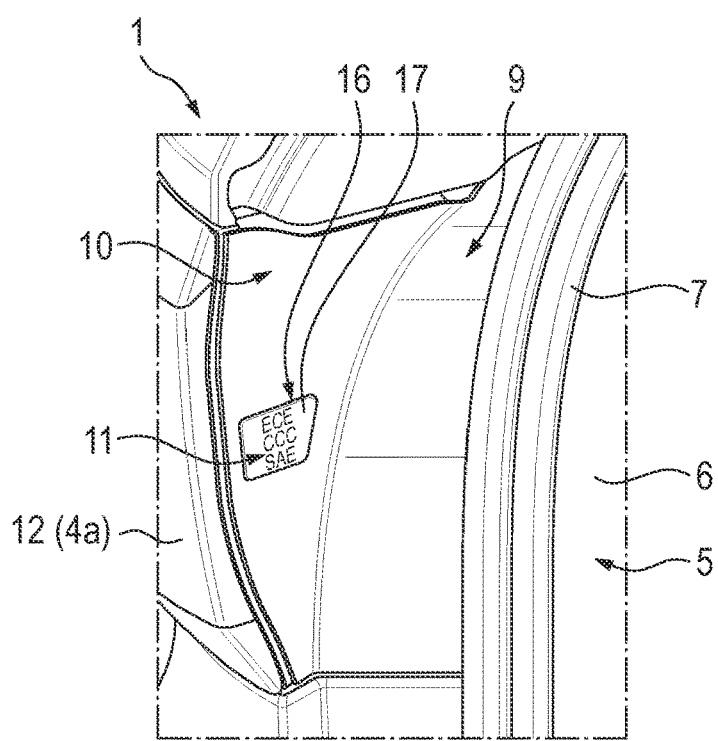
FIG. 4 is a perspective illustration of the region of the vehicle rear that is relevant to the invention in the case of an open tailgate with the screen of FIG. 3 in a mounted end state thereof.

In order to address this disadvantageous circumstance and/or minimize the complexity, the screen 10 according to FIGS. 3 and 4 has a passage opening 15 that, in the mounted state of the screen 10, is occupied by a tab 16 of the light housing 8/of the rear light 4a that has a complementary shape with respect to the passage opening 15 of the screen 10 and is located in front of the light housing 8 of the rear light 4a. Rather than the passage opening 15, the screen 10 can also have a lateral cutout occupied by the tab 16 (not shown in the drawing).

Accordingly, a tab surface 17 of the tab 16 visible from outside the vehicle is provided in the mounted state of the screen 10 (cf. FIG. 4). The marks 11 already mentioned above are provided, relating to the rear light 4a, on the tab surface 17 of the tab 16 that is visible from outside the vehicle and/or incorporated in said tab surface 17.

As is further evident from FIG. 4, the tab 16, in the mounted state of the screen 10, is substantially flush with the screen 10, as a result of which it is possible, for the one part, to attain a high fluid-tightness with respect to said water channel 9, and, for the other part, other possibilities where water and dirt may accumulate are avoided.

As is additionally evident from FIG. 4, the tab 16 according to a preferred embodiment of the invention is fixedly connected to the light housing 8 of the rear light 4a, with further preference is formed in one piece therewith. The light housing 8 substantially consists of a plastic and is preferably produced according to a plastics injection molding method that is known per se. In this respect, the tab 16 can be produced at the light housing 8 particularly easily and cost-effectively. Alternatively, the tab 16 may also be releasably connected to the light housing 8 so as to offer extended possibilities for assigning specific marks 11 to the relevant light housing 8 (not shown in the drawing).

With preference, but not in a restrictive manner, said marks 11 comprise market-specific test and/or approval marks, such as ECE, CCC and/or SAE, marks for identifying the rear light 4a, revision marks, distinguishing marks, orientation marks and/or symbols.

The marks 11 are preferably introduced in the tab surface 17 of the tab 16 visible from the outside by way of laser marking (laser engraving). Alternatively, the marks 11 can also be engraved in the tab 16 by means of the already mentioned set of tools, in particular by means of a pen or a milling cutter, or be provided on the tab 16 by means of a separate plaque (not illustrated in the drawing).

In order to extend the marking possibilities in particular relating to the rear light 4a, at least one further marking location 18 for providing and/or introducing further marks 11a, in the present case indeterminate and denoted with "XYZ," is provided at the light housing 8 of the rear light 4a directly adjacent to the tab 16. According to this exemplary embodiment, the further marking location 18 is arranged, by way of example, below the tab 16 and is schematically denoted by a dashed line. The further marks 11a may be, for example, internal revision markings of the producer or supplier of the rear light 4a and/or of the light housing 8 with information relating to the building condition, the hardware status, software status, production date, circuit board version of the rear light 4a and/or the like.

LIST OF REFERENCE SIGNS

1 Motor vehicle
2 Rear opening
3 Tailgate
4a Rear light
4b Rear light
5 Cargo hold
6 Body panel
7 Seal arrangement
8 Light housing
9 Water channel
10 Screen
11 Mark
11a Mark
12 Lens
13 Positive-locking means
14 Counter positive-locking means 15 Passage opening
16 Tab
17 Tab surface
18 Marking location

The invention claimed is:

1. A motor vehicle, comprising:
a body having a rear opening formed therein and a water channel disposed or formed adjacent to said rear opening;
a screen;
a rear light having a light housing with a tab, said screen covering said light housing and is attached in a region of said water channel; and
said screen having a passage opening or a cutout formed therein that, in a mounted state of said screen, is occupied by said tab of said light housing of said rear light whose shape is complementary to that of said passage opening or said cutout of said screen, said tab having marks relating to said rear light applied to a tab surface of said tab and/or are introduced into said tab surface, that is visible from outside the motor vehicle when said screen is in the mounted state.

2. The motor vehicle according to claim 1, wherein in the mounted state of said screen, said tab is flush with said screen.

3. The motor vehicle according to claim 1, wherein said tab is fixedly or releasably connected to said light housing of said rear light.

4. The motor vehicle according to claim 1, wherein said marks have market-specific test and/or approval marks, marks for identifying said rear light, revision marks, distinguishing marks, orientation marks and/or symbols.

5. The motor vehicle according to claim 1, wherein said marks are introduced in said tab surface of said tab visible from the outside by way of laser marking or by means of a set of tools.

6. The motor vehicle according to claim 1, wherein at least one further marking location for providing and/or introducing further marks is provided at said light housing of said rear light directly adjacent to said tab.

\* \* \* \* \*